United States Patent [19]

Ebert et al.

[11] Patent Number: 5,155,205

[45] Date of Patent: Oct. 13, 1992

[54] AROMATIC POLYCARBONATE CONTAINING A SPECIAL FLUORINE-CONTAINING BISPHENOL COMPONENT

[75] Inventors: Wolfgang Ebert, Krefeld; Michael Negele, Cologne; Gerhard Fennhoff, Willich, all of Fed. Rep. of Germany

[73] Assignee: Bayer Aktiengesellschaft, Leverkusen, Fed. Rep. of Germany

[21] Appl. No.: 641,235

[22] Filed: Jan. 15, 1991

[30] Foreign Application Priority Data

Jan. 24, 1990 [DE] Fed. Rep. of Germany ....... 4001933

[51] Int. Cl.$^5$ .............................................. C08G 64/10
[52] U.S. Cl. .................................. 528/202; 525/462; 525/468; 528/171; 528/174; 528/196; 528/204

[58] Field of Search ............... 528/202, 204, 196, 171, 528/174; 525/468, 462

[56] References Cited

U.S. PATENT DOCUMENTS 4,346,211  8/1982  Krishnan et al. ................... 528/202
4,379,910  4/1983  Mark et al. .......................... 528/202

Primary Examiner—Harold D. Anderson
Attorney, Agent, or Firm—Sprung Horn Kramer & Woods

[57] ABSTRACT

New aromatic polycarbonates contain, in their bisphenol moiety, at least in part bisphenols of the type 1,1-bishydroxyphenylhexafluorodichlorocyclopentane, 1,1-bishydroxyphenylheptafluoromonochlorocyclopentane or 1,1-bishydroxyphenyloctafluorocyclopentane.

5 Claims, No Drawings

AROMATIC POLYCARBONATE CONTAINING A SPECIAL FLUORINE-CONTAINING BISPHENOL COMPONENT

The present invention relates to new aromatic polycarbonates containing a special fluorine-containing bisphenol component, to their preparation and to their use.

Homopolycarbonates containing 2,2-bis-(4-hydroxyphenyl)-1,1,1,3,3,3-hexafluoropropane as the bisphenol component (see Christopher and Fox, Polycarbonates, Reinhold Publ. Corp. New York 1962, page 163 and USSR Patent Specification 132,403) and corresponding copolycarbonates (see EP-OS (European Published Specification) 29,111) are known. Block copolycarbonates formed from aromatic carbonate structural units and aliphatic polyether, polyester, polyurethane or polyolefin structural units are also known. The aromatic carbonate structural units can consist of fluorinated diphenolalkanes (see DE-AS (German Published Specification) 1,162,559). British Patent Specification 1,141,716 describes aromatic polycarbonates containing a fluorinated bisphenol component in which, inter alia, 2,2-bis-(4-hydroxyphenyl)-hexafluoropropane is quoted as the fluorinated bisphenol.

Polycarbonates of this type have refractive indices which are often too high for applications in the optical field.

New aromatic polycarbonates of the formula (I)

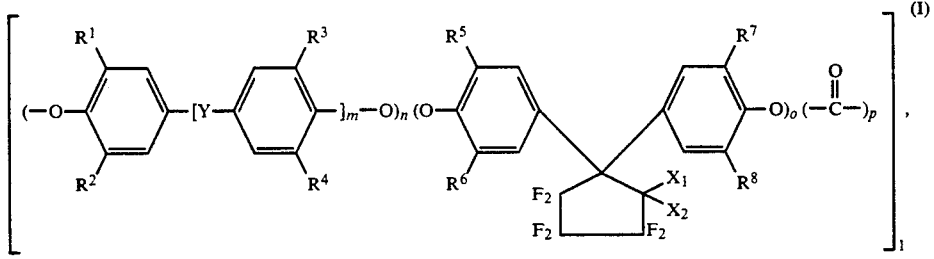

have now been found in which
F represents fluorine,
l represents an integer from 2 to 600,
n, o and p represent the number of moles of the particular components and meet the following conditions
n+o=p and
o:(n+o)=0.01 to 1,
m represents zero or 1,
$R^1$ to $R^4$ independently of one another each represent hydrogen, $C_1$–$C_5$-alkyl or halogen,
Y denotes a single bond, oxygen, sulphur, $SO_2$ or a $C_1$–$C_8$-alkylene, $C_2$–$C_8$-alkylidene, $C_3$–$C_{12}$-cycloalkylenealkylidene, $C_7$–$C_{18}$-aralkylene or $C_7$–$C_{18}$-aralkylidene group,
$X_1$ and $X_2$ independently of one another represent fluorine or chlorine and
$R^5$ to $R^8$ independently of one another each represent hydrogen, $C_1$–$C_5$-alkyl, benzyl, phenyl, $C_1$–$C_5$-alkoxy, benzyloxy, phenoxy or halogen.

Preferred aromatic polycarbonates of the formula (I) are characterized in that
l represents an integer from 4 to 400,
n, o and p meet the following conditions
n+o=p and
o:(n+o)=0.05 to 1,
m represents 1,
$R^1$ to $R^4$ independently of one another each represent hydrogen, methyl, chlorine or bromine,
Y denotes sulphur, $SO_2$ or a $C_1$–$C_8$-alkylene, $C_2$–$C_8$-alkylidene, $C_5$–$C_6$-cycloalkylene, $C_5$–$C_6$-cyclohexylidene, $C_7$–$C_{15}$-aralkylene or $C_7$–$C_{15}$-aralkylidene group,
$X_1$ and $X_2$ represent fluorine and
$R^5$ to $R^8$ independently of one another represent hydrogen, methyl, methoxy, chlorine or bromine.

Aromatic polycarbonates of the formula (I) which are particularly preferred are characterized in that
l represents an integer from 24 to 300,
n, o and p meet the following conditions
n+o=p and
o:(n+o)=0.01 to 1,
m represents 1,
$R^1$ to $R^4$ independently of one another represent hydrogen or methyl,
Y denotes sulphur, $SO_2$ or a $C_1$–$C_5$-alkylene, $C_2$–$C_5$-alkylidene, cyclohexylene, cyclohexylidene, $C_7$–$C_{13}$-aralkylene or $C_7$–$C_{13}$-aralkylidene group,
$X_1$ and $X_2$ represent fluorine and
$R^5$ to $R^8$ independently of one another represent hydrogen or methyl.

Provided that they are built up from several bisphenols, the polycarbonates, according to the invention, of the formula (I) can contain different bisphenol units in the form of blocks or in a statistical distribution.

It is an essential characteristic of polycarbonates according to the invention that their bisphenol content originates at least in part from bisphenols of the type 1,1-bishydroxyphenylhexafluorodichlorocyclopentane or 1,1-bishydroxyphenylheptafluoromonochlorocyclopentane or 1,1-bishydroxyphenyloctafluorocyclopentane.

The present invention also relates to a process for the preparation of polycarbonates of the formula (I) which is characterized in that o mol of bisphenols of the formula (II)

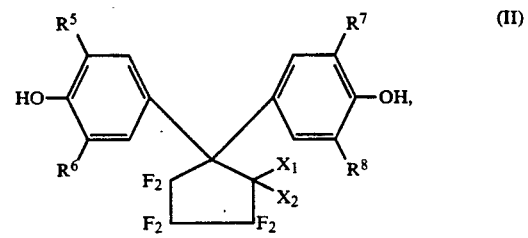

in which the symbols used have the meaning indicated in formula I, are reacted, if appropriate with the addition of n mol of bisphenols of the formula (III)

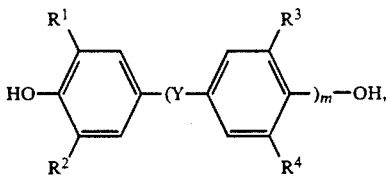

in which the symbols used have the meaning indicated in formula (I), with at least p mol of phosgene, $COBr_2$ and/or a bischlorocarbonic acid ester, if appropriate with the addition of catalysts, chain stoppers and/or branching agents and in this regard the conditions $n+O \geq p$
$o:(n+o)=0.01$ to 1 are maintained.

Preferred bisphenols of the formula (II) are those in which the symbols used have the meaning indicated as preferred in formula (I).

Bisphenols of the formula (II) which are particularly preferred are 1,1-bis-(4-hydroxyphenyl)-octafluorocyclopentene and 1,1-bis-(3,5-dimethyl-4-hydroxyphenyl)-octafluorocyclopentene.

Bisphenols of the formula (II) can be obtained by reacting a fluorine-containing cyclopentanone of the formula (IIa)

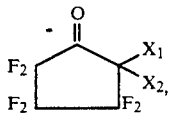

in which $X_1$ and $X_2$ independently of one another represent fluorine or chlorine, with at least a 2-fold molar amount of one or more aryl compounds of the formula (IIb)

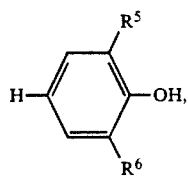

in which $R^5$ and $R^6$ have the meaning indicated in formula I, in the presence of anhydrous hydrofluoric acid.

Fluorine-containing cyclopentanones of the formula II are accessible, for example, in accordance with J. Org. Chem. 33, 2693 (1968) or from U.S. Pat. Nos. 3,129,248, 3,341,602 and 3,321,515.

The bisphenols of the formula (II) and a process for their preparation are covered by a separate patent application of their own.

Bisphenols of the formula (III) are known. The following may be mentioned as examples: bis-(4-hydroxyphenyl)-methane, 2,2-bis-(4-hydroxyphenyl)-propane, 1,1-bis-(4-hydroxyphenyl)-cyclohexane, 1,1-bis-(4-hydroxy-3,5-dimethylphenyl)-cyclohexane, 1,1-bis-(4-hydroxyphenyl)-1-phenylethane, 2,2-bis-(4-hydroxyphenyl)butane, 2,2-bis-(4-hydroxyphenyl)-pentane, 3,3-bis-(4-hydroxyphenyl)-pentane, 2,2-bis-(4-hydroxyphenyl)-hexane, 3,3-bis-(4-hydroxyphenyl)-hexane, 2,2-bis-(3,5-dichloro-4-hydroxyphenyl)-propane, 2,2-bis-(3,5-dibromo-4-hydroxyphenyl)-propane, bis-(4-hydroxyphenyl)-phenylmethane, 2,2-bis-(4-hydroxy-3,5-dimethylphenyl)-propane and 2,2-bis-(4-hydroxyphenyl)-diphenylmethane.

The following are particularly preferred bisphenols of the formula (III): 2,2-bis-(4-hydroxyphenyl)-propane, 1,1-bis-(4-hydroxyphenyl)-cyclohexane, 2,2-bis-(4-hydroxy-3,5-dimethylphenyl)-propane, 2,2-bis-(4-hydroxyphenyl)-diphenylmethane, bis-(4-hydroxyphenyl) sulphide and bis-(4-hydroxyphenyl) sulphone.

It is preferable for the condition $o:(n+o)=0.01$ to 1 to be maintained in the process according to the invention.

Suitable catalysts are, if appropriate, those which are customary in the preparation of polycarbonates, for example tertiary amines and quarternary ammonium salts. Catalysts can be employed, for example, in proportions of 0.1 to 10 mol %, relative to bisphenols of the formulae (II) and (III). This proportion is preferably within the range from 0.5 to 5 mol %.

Suitable chain stoppers are, if appropriate, those which are customary in the preparation of polycarbonates, for example monophenols, such as phenol, p-tert.-butylphenol, p-cresol, p-chlorophenol and p-bromophenol. Chain stoppers can be employed, for example, in proportions of 0.5 to 8 mol %, preferably 2 to 6 mol %, relative to the bisphenols employed.

Suitable branching agents are, if appropriate, those which are customary in the preparation of polycarbonates, for example triphenols and tetraphenols, and also tricarboxylic acid trichlorides and tetracarboxylic acid tetrachlorides. Branching agents can be employed, for example, in proportions of 0.05 to 3.5 mol %, preferably 0.1 to 1.5 mol %, relative to the bisphenols employed.

Procedures customary in the preparation of polycarbonates can be used in the preparation, according to the invention, of the new aromatic polycarbonates (see, for example, Ullmann, Encyclopadie der technischen Chemie ("Encyclopedia of Industrial Chemistry"), 4th edition, volume 19, pages 55 to 57), for example the phase boundary process, the pyridine process or the transesterification process.

The procedure followed in the preferred phase boundary process can, for example, be first to combine the bisphenol or bisphenols of the formulae (II) and, if appropriate, (III) with an aqueous alkaline solution, then to add a solvent for polycarbonates, then to add, with stirring and at temperatures of, for example, 0 to 100° C., phosgene, $COBr_2$ or a bischlorocarbonic acid ester, maintaining the pH of the reaction mixture meanwhile at a value of 10 or higher and, if appropriate after washing the organic phase, to isolate the carbonate formed by precipitating it from the organic phase or evaporating or stripping off the solvent completely or partially.

The aqueous alkaline solution can be prepared, for example, by means of alkali metal hydroxides and/or alkaline earth metal hydroxides. Examples of suitable solvents for polycarbonates are chlorinated hydrocarbons, such as methylene chloride, chloroform, ethylene chloride and chlorobenzene, and also mixtures thereof. The use of phosgene is preferred compared with the use of $COBr_2$ and bischlorocarbonic acid esters. The pH is most simply kept at a value of 10, preferably 12, or higher, if a corresponding excess of aqueous alkaline solution is employed, that is to say corresponding to more than is theoretically necessary for the formation of the bisphenates.

The procedure followed in the pyridine process can, for example, be to dissolve the bisphenols of the formulae (II) and, if appropriate, (III) in a solvent, to add the stoichiometrically required amount of a tertiary amine or an excess thereof, to pass phosgene into this homogeneous solution with stirring at temperatures of, for example, 0° to 50° C., then to remove the resulting hydrochloride of the tertiary amine and to isolate the resulting polycarbonate from the remaining organic phase by precipitating it or by evaporating or stripping off the solvent completely or partially. Suitable solvents are those which can also be used in the phase boundary process. It is preferable to use pyridine as the tertiary amine, but other tertiary amines, for example N,N-dimethylaniline or N,N-dimethylcyclohexylamine, can also The procedure followed in the transesterification process can, for example, be to melt the bisphenol or bisphenols of the formulae (II) and, if appropriate, (III), together with a diaryl carbonate and a transesterification catalyst, in an autoclave and to distil off under reduced pressure and at elevated temperature the hydroxyaryl compound liberated from the diaryl carbonate. The diaryl carbonate used is preferably diphenyl carbonate, from which phenol is then liberated, for example under pressures down to 0.5 mbar and at temperatures of up to 300° C.

Aromatic polycarbonates according to the invention can have, for example, average molecular weights $M_w$ of between 500 and 250,000, determined via $\eta_{rel}$ and measured on a 5% strength solution in methylene chloride at 25° C. $M_w$ is preferably between 1,000 and 170,000, particularly preferably between 10,000 and 80,000.

Aromatic polycarbonates according to the invention are distinguished, surprisingly, by a low refractive index and a high glass transition temperature, which makes them particularly suitable for applications in the optical field. The heat distortion point of aromatic polycarbonates according to the invention is approximately the same as in the case of other polycarbonates, for example those based on bisphenol A.

The present invention therefore also relates to the use of aromatic polycarbonates of the formula (I) in the production of optical devices, for example in the production of compact discs and light guides. In the production of light guides by means of the polycarbonates according to the invention, the latter can be used, in particular, as claddings, it being possible to use known polycarbonates (having a higher refractive index) as the core material.

Aromatic polycarbonates according to the invention are strongly water-repelling and can therefore also be used with advantage in cases where low water absorption and high dimensional stability are important, for example in automobile construction or in films.

Depending on the use intended, various additives can be added to the aromatic polycarbonates according to the invention. Thus, for example, it is possible to add pigments in order to obtain moulding materials of an opaque colour. Examples of suitable pigments are titanium dioxide, chrome yellow, chrome orange and chrome green. Oil-soluble dyestuffs can also be mixed in. It is also possible to add stabilizers, for example those which are effective against heat and/or the action of light (see, for example, EP-OS (European Published Specification) 143,906 and DE-OS (German Published Specification) 2,255,639) and/or fillers, for example glass fibres.

Aromatic polycarbonates according to the invention can, if appropriate, be mixed with other thermoplastics, for example with thermoplastic polycarbonates or with ABS (acrylo-nitrile/butadiene/styrene) polymers.

The aromatic polycarbonates according to the invention and mixtures containing them can be processed together with other thermoplastics in a manner known per se to give shaped articles and films.

EXAMPLES

The relative viscosity $\eta_{rel}$ quoted in each case below was determined, in each case, on solutions of 0.5 g of polymer in 100 ml of methylene chloride at 25° C. The melt viscosities $\eta_{melt}$ also quoted below were measured at 300° C.

EXAMPLE 1

19.9 g (0.05 mol) of 1,1-bis-(4-hydroxyphenyl)octafluorocyclopentane (98% pure), 10 g (0.25 mol) of sodium hydroxide, 200 ml of distilled water and 200 ml of methylene chloride were initially placed at 18° C. in a 1 l glass flask equipped with a reflux condenser, a stirrer, a thermometer and an inlet tube, and 7.5 g (0.075 mol) of phosgene were passed in in the course of 20 minutes. 1 mol % (relative to the bisphenol) of N-ethylpyridine was then added as catalyst, and stirring was continued for 1 hour at 20° C. The mixture was then acidified with phosphoric acid and the organic phase was washed with distilled water until neutral. The organic phase was dried and concentrated (12 hours at 60° C. and 10 mbar). 16.1 g of polycarbonate were obtained in this way. The product had the following characteristics:

$\eta_{rel} = 1.157$
$\eta_{melt} = 210$ Pa.s
$T_g = 155.5°$ C.
Refractive index $n_D^{20} = 1.540$.

EXAMPLE 2

The procedure was as in Example 1, but high-purity, 99.9% pure 1,1-bis-(4-hydroxyphenyl)-octafluorocyclopentane was employed. 14.7 g of polycarbonate having $\eta_{rel} = 2.335$ were obtained.

EXAMPLE 3

The procedure followed was as in Example 1, but 19.9 g (0.05 mol) of 1,1-bis-(4-hydroxyphenyl)-octafluorocyclopentane, 11.4 g (0.05 mol) of 2,2-bis-(4-hydroxyphenyl)-propane, 20 g of sodium hydroxide, 400 ml of distilled water, 400 ml of methylene chloride, 300 mg of p-tert.-butylphenol, 15 g (0.15 mol) of phosgene and 1 mol % of N-ethylpiperidine were employed. 27.5 g of polycarbonate having the following characteristics were obtained:

$\eta_{rel} = 1.207$
$\eta_{melt} = 120$ Pa.s
$T_g = 151.5°$ C.
Refractive index $n_D^{20} = 1.507$.

EXAMPLE 4

The procedure followed was as in Example 3, but 450 mg of p-tert.-butylphenol were employed as chain stopper. 33.4 g of polycarbonate having the following characteristics were obtained:

$\eta_{rel} = 1.152$
$\eta_{melt} = 82$ Pa.s
$T_g = 154°$ C.

Refractive index $n_D^{20} = 1.510$.

EXAMPLE 5

Preparation of 1,1-bis-(4-hydroxyphenyl)octafluorocyclopentane (not in accordance with the invention).

684 g (3.0 mol) of octafluorocyclopentanone in 1700 ml of anhydrous hydrofluoric acid were initially placed in a V4A steel pressure-resistant stirred vessel of capacity 5 l at 5° C. (ice cooling). After 575 g (6.1 mol) of phenol had been added, the reaction temperature was raised to 25 and not more than 40° C., and the mixture was stirred for 6 hours. The hydrofluoric acid was then distilled off at not more than 100 mbar and at 50° C., and the yellowish-white residue (approx. 1200 g) was washed with water until substantially acid-free. After drying, the crude product had a melting point of 164° to 167° C.

The dried material was purified further by being dissolved in 2000 ml of 5% strength aqueous sodium hydroxide solution and re-precipitated by stirring in 10% strength hydrochloric acid. After filtration with suction and drying, 1140 g (2.86 mol) of analytically pure material having a melting point of 168° to 170° C. were obtained. The yield after re-precipitation, relative to octafluorocyclopentanone employed, was 95.3%.

What is claimed is:

1. An aromatic polycarbonate of the formula (I)

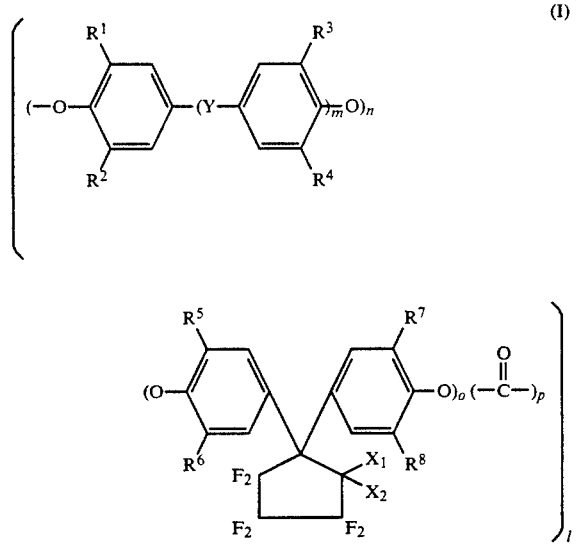

in which

F represents fluorine, l represents an integer from 2 to 600, n, o and p represent the number of mol of the particular component and meet the following conditions n+o=p and o:(n+o)=0.01 to 1, m represents zero or 1, $R^1$ to $R^4$ independently of one another each represent hydrogen, $C_1$-$C_5$-alkyl or halogen, Y denotes a single bond, or Y is oxygen, sulphur, $SO_2$ or a $C_1$-$C_8$-alkylene, $C_2$-$C_8$-aralkylene, $C_3$-$C_{12}$-cycloalkylenealkylidene, $C_7$-$C_{18}$-aralkylene or $C_7$-$C_{18}$-aralkylidene group, $X_1$ and $X_2$ independently of one another represent fluorine or chlorine and $R^5$ to $R^8$ independently of one another each represent hydrogen, $C_1$-$C_5$-alkyl, benzyl, phenyl, $C_1$-$C_5$-alkoxy, benzyloxy, phenoxy or halogen.

2. An aromatic polycarbonate according to claim 1, in which l represents an integer from 4 to 400, n, o and p meet the following conditions n+o=p and o:(n+o)=0.05 to 1, m represents 1, $R^1$ to $R^4$ independently of one another each represent hydrogen, methyl, chlorine or bromine, Y denotes sulphur, $SO_2$ or a $C_1$-$C_8$-alkylene, $C_2$-$C_8$-alkylidene, $C_5$-$C_6$-cycloalkylene, $C_5$-$C_6$-cyclohexylidene, $C_7$-$C_{15}$-aralkylene or $C_7$-$C_{15}$-aralkylidene group, $X_1$ and $X_2$ represent fluorine and $R^5$ to $R^8$ independently of one another represent hydrogen, methyl, methoxy, chlorine or bromine.

3. An aromatic polycarbonate according to claim 1, in which l represents an integer from 24 to 300, n, o and p meet the following conditions n+o=p and o:(n+o)=0.01 to 1, m represents 1, $R^1$ to $R^4$ independently of one another represent hydrogen or methyl, Y denotes sulphur, $SO_2$ or a $C_1$-$C_5$-alkylene, $C_2$-$C_5$-alkylidene, cyclohexylene, cyclohexylidene, $C_7$-$C_{13}$-aralkylene or $C_7$-$C_{13}$-aralkylidene group, $X_1$ and $X_2$ represent fluorine and $R^5$ to $R^8$ independently of one another represent hydrogen or methyl.

4. A mixture containing a polycarbonate according to claim 1, and one or more other thermoplastic polycarbonates or ABS (acrylo-nitrile/butadiene/styrene) polymers.

5. An optical device of the polycarbonate of claim 1.

UNITED STATES PATENT AND TRADEMARK OFFICE
CERTIFICATE OF CORRECTION

PATENT NO. : 5,155,205

DATED : October 13, 1992

INVENTOR(S) : Ebert, et al.

It is certified that error appears in the above-identified patent and that said Letters Patent is hereby corrected as shown below:

Col. 8, line 10    Delete " aralkylene " and substitute -- alkylidene --

Signed and Sealed this

Twenty-ninth Day of March, 1994

Attest:

BRUCE LEHMAN

*Attesting Officer*    *Commissioner of Patents and Trademarks*